(12) United States Patent
Hsu

(10) Patent No.: US 8,666,549 B2
(45) Date of Patent: Mar. 4, 2014

(54) AUTOMATIC MACHINE AND METHOD FOR CONTROLLING THE SAME

(75) Inventor: Fu-Kuan Hsu, Taipei (TW)

(73) Assignee: Compal Communications, Inc., Neihu, Taipei (TW)

( * ) Notice: Subject to any disclaimer, the term of this patent is extended or adjusted under 35 U.S.C. 154(b) by 470 days.

(21) Appl. No.: 13/101,145

(22) Filed: May 5, 2011

(65) Prior Publication Data

US 2011/0295425 A1 Dec. 1, 2011

(30) Foreign Application Priority Data

May 28, 2010 (TW) .............................. 99117198 A

(51) Int. Cl.
*G06F 19/00* (2011.01)

(52) U.S. Cl.
USPC ........... 700/250; 700/245; 455/420; 455/418; 446/141; 446/142; 379/88.03

(58) Field of Classification Search
USPC .................... 700/245, 250, 94; 446/141, 142; 379/88.03; 382/275, 255; 348/241; 455/566, 561
See application file for complete search history.

(56) References Cited

U.S. PATENT DOCUMENTS

| | | | |
|---|---|---|---|
| 6,718,231 B2 * | 4/2004 | Konno et al. ................. | 700/245 |
| 7,630,986 B1 * | 12/2009 | Herz et al. ............................ | 1/1 |
| 7,962,629 B2 * | 6/2011 | Bigioi et al. ................... | 709/227 |
| 2007/0005822 A1 * | 1/2007 | Yamamoto et al. .............. | 710/15 |
| 2011/0143811 A1 * | 6/2011 | Rodriguez ................... | 455/556.1 |
| 2011/0212717 A1 * | 9/2011 | Rhoads et al. ................. | 455/420 |

FOREIGN PATENT DOCUMENTS

| | | |
|---|---|---|
| CN | 1313781 A | 9/2001 |
| CN | 1392824 A | 1/2003 |
| CN | 101411948 A | 4/2009 |
| JP | 2001179666 A | 7/2001 |
| JP | 200266156 A | 3/2002 |
| JP | 2003285285 A | 10/2003 |
| JP | 2003345435 A | 12/2003 |
| JP | 200434273 A | 2/2004 |
| JP | 200574535 A | 3/2005 |
| JP | 20067341 A | 1/2006 |
| JP | 2006142407 A | 6/2006 |
| JP | 200750461 A | 3/2007 |

* cited by examiner

*Primary Examiner* — Ronnie Mancho

(74) *Attorney, Agent, or Firm* — Winston Hsu; Scott Margo

(57) ABSTRACT

An automatic machine includes N output units, a storage unit and a control unit. The control unit is electrically connected to the output units and the storage unit. The storage unit stores a first reaction pattern corresponding to a first command. The first reaction pattern includes a header and N reaction modes and each of the reaction modes is corresponding to one of the output units. Each of the reaction modes includes M reaction frames. The header records a number of the reaction frames of each reaction mode. The control unit receives the first command, looks the first reaction pattern up in the storage unit according to the first command, and selectively controls at least one of the output units to perform the reaction frames correspondingly according to the header and the reaction modes.

12 Claims, 5 Drawing Sheets

| Header 1600 | Number of reaction frames of motion mode | Number of reaction frames of facial expression mode | Number of reaction frames of voice mode |
|---|---|---|---|
| | 2 | 1 | 3 |

| Motion mode 1602 | | Motor information 1 | Motor information 2 | Motor information 3 | Motor information 4 | Motor information 5 | Time tag |
|---|---|---|---|---|---|---|---|
| | Reaction frame 1 | 0 | 5 | 10 | 15 | 20 | 5 |
| | Reaction frame 2 | 5 | 10 | 15 | 20 | 25 | 10 |

| Facial expression mode 1604 | | Light emitting serial number | Time tag |
|---|---|---|---|
| | Reaction frame 1 | 1 | 5 |

| Voice mode 1606 | | Voice type | Length of string | Time tag | String |
|---|---|---|---|---|---|
| | Reaction frame 1 | 0 | 48 bits | 1 | How are you |
| | Reaction frame 2 | 1 | 48 bits | 5 | I am fine |
| | Reaction frame 3 | 0 | 32 bits | 10 | Thank you |

160

| Header 1600 | Number of reaction frames of motion mode | Number of reaction frames of facial expression mode | Number of reaction frames of voice mode |
|---|---|---|---|
| | 2 | 1 | 3 |

| Motion mode 1602 | | Motor information 1 | Motor information 2 | Motor information 3 | Motor information 4 | Motor information 5 | Time tag |
|---|---|---|---|---|---|---|---|
| | Reaction frame 1 | 0 | 5 | 10 | 15 | 20 | 5 |
| | Reaction frame 2 | 5 | 10 | 15 | 20 | 25 | 10 |

| Facial expression mode 1604 | | Light emitting serial number | Time tag |
|---|---|---|---|
| | Reaction frame 1 | 1 | 5 |

| Voice mode 1606 | | Voice type | Length of string | Time tag | String |
|---|---|---|---|---|---|
| | Reaction frame 1 | 0 | 48 bits | 1 | How are you |
| | Reaction frame 2 | 1 | 48 bits | 5 | I am fine |
| | Reaction frame 3 | 0 | 32 bits | 10 | Thank you |

| Header 1620 | Number of reaction frames of motion mode | Number of reaction frames of facial expression mode | Number of reaction frames of voice mode |
|---|---|---|---|
| | 1 | 1 | 1 |

| Motion mode 1622 | | Motor information 1 | Motor information 2 | Motor information 3 | Motor information 4 | Motor information 5 | Time tag |
|---|---|---|---|---|---|---|---|
| | Reaction frame 1 | 20 | 25 | 30 | 35 | 40 | 5 |

| Facial expression mode 1624 | | Light emitting serial number | Time tag |
|---|---|---|---|
| | Reaction frame 1 | 2 | 5 |

| Voice mode 1626 | | Voice type | Length of string | Time tag | String |
|---|---|---|---|---|---|
| | Reaction frame 1 | 0 | 48 bits | 5 | WOW |

AUTOMATIC MACHINE AND METHOD FOR CONTROLLING THE SAME

BACKGROUND OF THE INVENTION

1. Field of the Invention

The invention relates to an automatic machine and method for controlling the same and, more particularly, to an automatic machine and method capable of simultaneously executing reactions including motion, facial expression and/or voice.

2. Description of the Prior Art

Recently, due to technological advances, robots are getting more and more popular. Furthermore, the price of a robot is decreasing due to mass production, so people may possess a robot easily. In regard to the design of the robot, functions are getting more and more complicated and real-time reaction is emphasized, e.g. judgment and response result from environmental condition, interaction between user and robot, etc. Generally speaking, output of a robot may include facial expression, body motion, voice, and so on. How to generate the aforesaid complicated outputs smoothly and simultaneously so as to make the robot act as a person is a big challenge in software design.

SUMMARY OF THE INVENTION

An objective of the invention is to provide an automatic machine and method capable of simultaneously executing reactions including motion, facial expression and/or voice.

According to one embodiment, an automatic machine of the invention comprises N output units, a storage unit and a control unit, wherein N is a positive integer. The control unit is electrically connected to the N output units and the storage unit. The storage unit stores a first reaction pattern corresponding to a first command. The first reaction pattern comprises a header and N reaction modes, and each of the reaction modes is corresponding to one of the output units. Furthermore, each of the reaction modes comprises M reaction frames, wherein M is 0 or a positive integer. The header records a number of the reaction frames of each reaction mode. The control unit receives the first command, looks the first reaction pattern up in the storage unit according to the first command, and selectively controls at least one of the output units to execute the reaction frames correspondingly according to the header and the reaction modes. In this embodiment, the N reaction modes may comprise a motion mode, a facial expression mode and/or a voice mode.

According to another embodiment, the invention provides a method for controlling an automatic machine, wherein the automatic machine comprises N output units and a storage unit, and N is a positive integer. The method comprises receiving a first command; looking a first reaction pattern up in the storage unit according to the first command, wherein the first reaction pattern comprises a header and N reaction modes, each of the reaction modes is corresponding to one of the output units, each of the reaction modes comprises M reaction frames, M is 0 or a positive integer, and the header records a number of the reaction frames of each reaction mode; and selectively controlling at least one of the output units to execute the reaction frames correspondingly according to the header and the reaction modes. In this embodiment, the N reaction modes may comprise a motion mode, a facial expression mode and/or a voice mode.

As mentioned in the above, when the control unit of the automatic machine of the invention receives a command and the storage unit stores a reaction pattern corresponding to the command, the control unit controls each of the output units to execute the corresponding reaction mode (e.g. motion mode, facial expression mode and/or voice mode) simultaneously. Accordingly, the automatic machine and controlling method of the invention can smoothly and simultaneously executing reactions including motion, facial expression and/or voice.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is a schematic diagram illustrating the first reaction pattern shown in FIG. 1.

FIG. 3 is a schematic diagram illustrating the second reaction pattern shown in FIG. 1.

DETAILED DESCRIPTION

Figure 1:
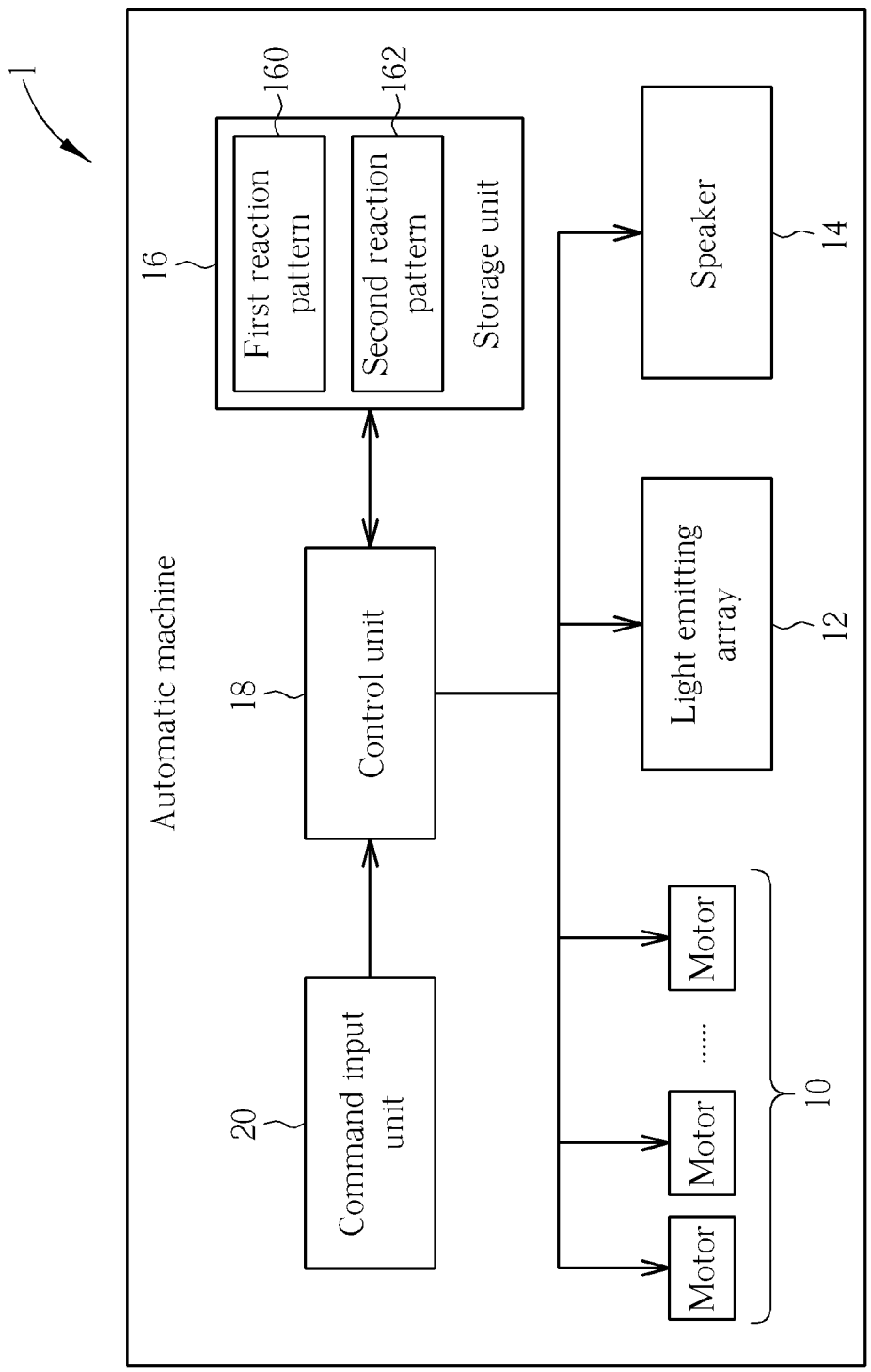
FIG. 1 is a functional block diagram illustrating an automatic machine according to one embodiment of the invention.

Referring to FIG. 1, FIG. 1 is a functional block diagram illustrating an automatic machine 1 according to one embodiment of the invention. The automatic machine 1 may be a robot and comprises N output units, wherein N is a positive integer. As shown in FIG. 1, the automatic machine 1 comprises a set of motors 10, a light emitting array 12, a speaker 14, a storage unit 16, a control unit 18 and a command input unit 20. In this embodiment, the set of motors 10, the light emitting array 12 and the speaker 14 are served as the output units of the automatic machine 10. It should be noted that the automatic machine 1 may comprise any one or two of the set of motors 10, the light emitting array 12 and the speaker 14, and it depends on practical applications.

In practical applications, the set of motors 10 can be used to drive motion of each part (e.g. head, upper limb, lower limb, etc.) of the automatic machine 1, and the number of the motors 10 can be determined based on practical applications. The light emitting array 12 may consist of a plurality of light emitting diodes or other light emitting components and can be used to show various facial expressions of the automatic machine 1. The speaker 14 may be any device capable of sounding a voice. The storage unit 16 may be a hard disc or other storage device capable of storing data. The control unit 18 may be a controller capable of calculating and processing data. The command input unit 20 may be a microphone, a button or other input devices capable of inputting data.

As shown in FIG. 1, the control unit 18 is electrically connected to the set of motors 10, the light emitting array 12, the speaker 14, the storage unit 16 and the command input unit 20. In this embodiment, the storage unit 16 stores a first reaction pattern 160 and a second reaction pattern 162, wherein the first reaction pattern 160 is corresponding to a first command and the second reaction pattern 162 is corresponding to a second command. It should be noted that the number of the reaction patterns of the invention may increase or decrease based on practical applications, so it is not limited to two. The first reaction pattern 160 and the second reaction pattern 162 may comprise a header and three reaction modes respectively, wherein each of the reaction modes is corresponding to one of the output units including the set of motors 10, the light emitting array 12 and the speaker 14, each of the reaction modes comprises M reaction frames, M is 0 or a positive integer, and the header records the number of the reaction frames of each reaction mode.

Referring to FIGS. 2 and 3, FIG. 2 is a schematic diagram illustrating the first reaction pattern 160 shown in FIG. 1, and FIG. 3 is a schematic diagram illustrating the second reaction pattern 162 shown in FIG. 1. As shown in FIG. 2, the first reaction pattern 160 comprises a header 1600 and three reaction modes including a motion mode 1602, a facial expression mode 1604 and a voice mode 1606, wherein the motion mode 1602 is corresponding to the set of motors 10, the facial expression mode 1604 is corresponding to the light emitting array 12, and the voice mode 1606 is corresponding to the speaker 14. As shown in FIG. 3, the second reaction pattern 162 also comprises a header 1620 and three reaction modes including a motion mode 1622, a facial expression mode 1624 and a voice mode 1626, wherein the motion mode 1622 is corresponding to the set of motors 10, the facial expression mode 1624 is corresponding to the light emitting array 12, and the voice mode 1626 is corresponding to the speaker 14.

In this embodiment, each of the reaction modes may comprise M reaction frames, M is 0 or a positive integer, and each of the headers 1600, 1620 records the number of the reaction frames of each reaction mode. As shown in FIG. 2, the motion mode 1602 comprises two reaction frames, the facial expression mode 1604 comprises one reaction frame, and the voice mode 1606 comprises three reaction frames. As shown in FIG. 3, each of the motion mode 1622, the facial expression mode 1604 and the voice mode 1606 comprises one reaction frame.

Each reaction frame of the motion mode 1602 or 1622 records a set of motor information and a time tag. In the motion modes 1602, 1622, each motor information represents a rotating angle of one of the motors 10. The time tag may be a suspend time or a time stamp. For example, if the time tag of the motion mode 1602 is a suspend time, the reaction frame 2 is executed only when the reaction frame 1 is executed completely and after five seconds; if the time tag of the motion mode 1602 is a time stamp, the reaction frame 1 is executed at fifth second exactly; and so on.

Figure 4:
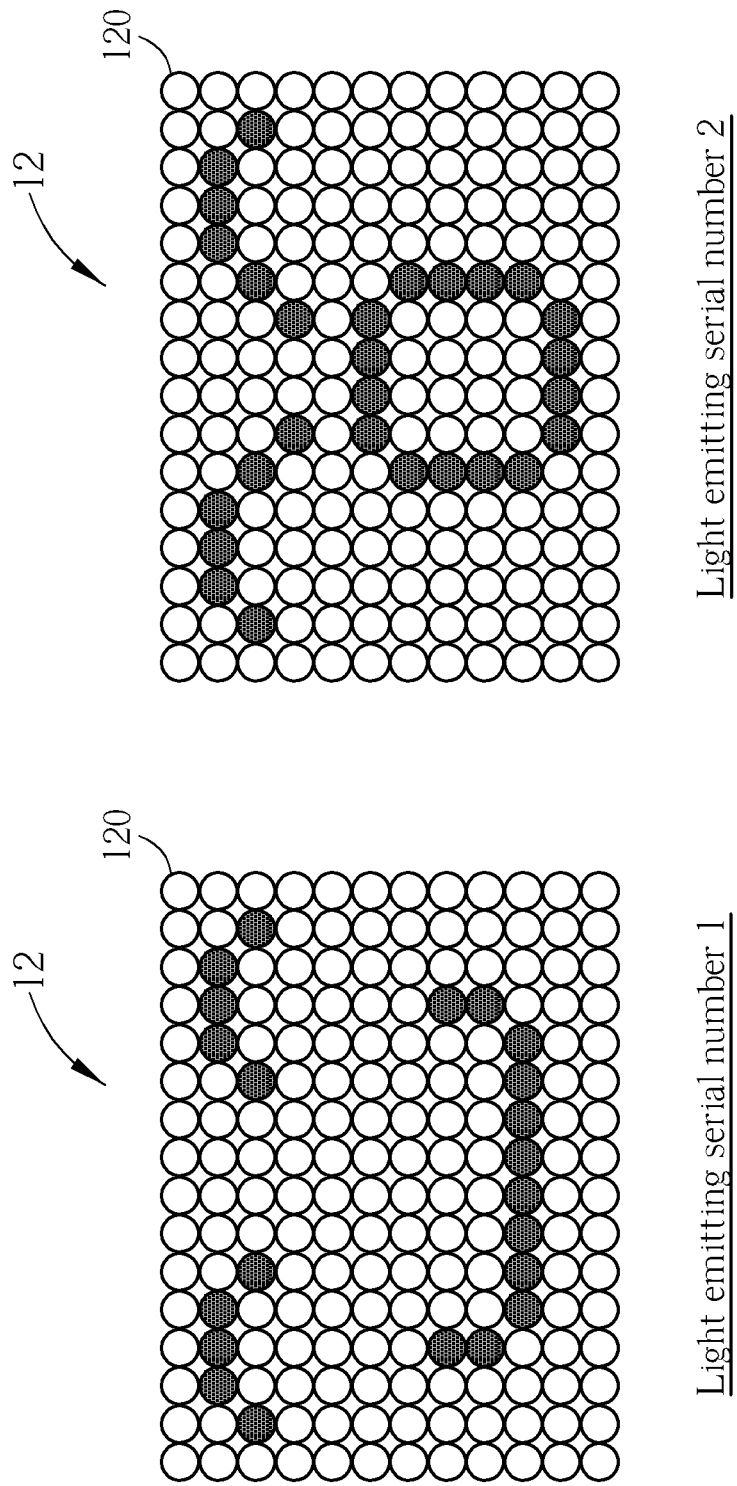
FIG. 4 is a schematic diagram illustrating the light emitting array corresponding to different light emitting serial number.

Each reaction frame of the facial expression mode 1604 or 1624 records a light emitting serial number and a time tag. The definition of the time tag is described in the above, so it will not be depicted herein again. Referring to FIG. 4, FIG. 4 is a schematic diagram illustrating the light emitting array 12 corresponding to different light emitting serial number. As shown in FIG. 4, the light emitting array 12 may consist of a plurality of light emitting diodes 120. Various facial expressions can be generated by controlling different light emitting diodes to emit light. As shown in FIG. 4, the light emitting serial number 1 shows a smile expression and the light emitting serial number 2 shows a surprised expression.

Each reaction frame of the voice mode 1606 or 1626 records a voice type, a string, a length of the string and a time tag. The definition of the time tag is described in the above, so it will not be depicted herein again. In this embodiment, the voice sounded by the speaker 14 may be generated by a text-to-speech technique or a voice file. For example, if the voice type is recorded as "0", the control unit 18 controls the speaker 14 to sound the corresponding voice file or sound file according to the corresponding string; if the voice type is recorded as "1", the control unit 18 converts the corresponding string to a synthesis speech by the text-to-speech technique and then controls the speaker 14 to sound the synthesis speech.

For example, the first command corresponding to the first reaction pattern 160 may be an "inquiry" command and the second command corresponding to the second reaction pattern 162 may be an "explosion" command. A user can use the command input unit 20 to input the "inquiry" command. After receiving the "inquiry" command, the control unit 18 looks the first reaction pattern 160 up in the storage unit 16 according to the "inquiry" command and controls the set of motors 10, the light emitting array 12 and the speaker 14 to execute the reaction frames correspondingly according to the header 1600, the motion mode 1602, the facial expression mode 1604 and the voice mode 1606. For example, when the set of motors 10 executes the reaction frames of the motion mode 1602, a hand (not shown) of the automatic machine 1 will be lifted up gradually so as to give a wave or handshake; when the light emitting array 12 executes the reaction frames of the facial expression mode 1604, the face of the automatic machine 1 will show a smile expression; and when the speaker 14 executes the reaction frames of the facial expression mode 1606, the automatic machine 1 will sound the voices such as "how are you", "I am fine", and "thank you" in turn according to the time tags.

Furthermore, in this embodiment, the first reaction pattern 160 may have a first priority and the second reaction pattern 162 may have a second priority. Once the control unit 18 receives the "explosion" command during the execution of the first reaction pattern 160 (e.g. the command input unit 20 receives a report), the control unit 18 will look the second reaction pattern 162 up in the storage unit 16 according to the "explosion" command and determine whether the second priority is prior to the first priority. In this embodiment, the second priority is set to be prior to the first priority. When the control unit 18 determines that the second priority is prior to the first priority, the control unit 18 will control the set of motors 10, the light emitting array 12 and the speaker 14 to pause or abandon the execution of the first reaction pattern 160 and control the set of motors 10, the light emitting array 12 and the speaker 14 to execute the second reaction pattern 162. For example, when the set of motors 10 executes the reaction frames of the motion mode 1622, a head (not shown) of the automatic machine 1 will rotate; when the light emitting array 12 executes the reaction frames of the facial expression mode 1624, the face of the automatic machine 1 will show a surprised expression; and when the speaker 14 executes the reaction frames of the facial expression mode 1626, the automatic machine 1 will sound the voices such as "wow" or "I am so scared" according to the time tags.

Figure 5:
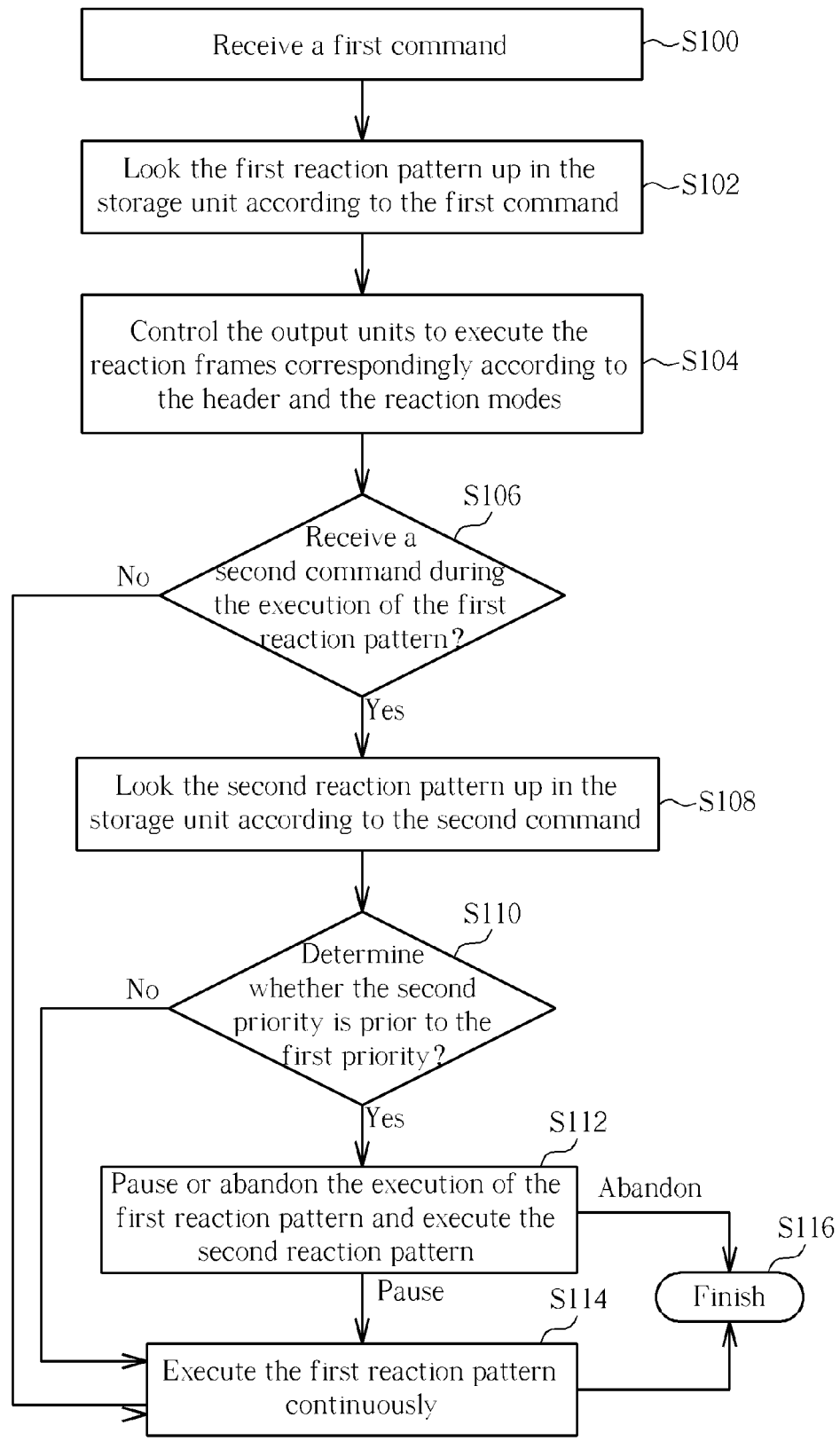
FIG. 5 is a flowchart illustrating a method for controlling the automatic machine according to one embodiment of the invention.

Referring to FIG. 5, FIG. 5 is a flowchart illustrating a method for controlling the automatic machine 1 according to one embodiment of the invention. Also, please refer to FIGS. 1 to 3 along with FIG. 5. First of all, step S100 is performed to receive a first command. Afterward, step S102 is performed to look the first reaction pattern 160 up in the storage unit 16 according to the first command. Step S104 is then performed to control the output units (e.g. the set of motors 10, the light emitting array 12 and the speaker 14 shown in FIG. 1) to execute the reaction frames correspondingly according to the header 1600 and the reaction modes (e.g. the motion mode 1602, the facial expression mode 1604 and the voice mode 1606 shown in FIG. 2). If the control unit 18 does not receive a second command (i.e. other commands) during the execution of the first reaction pattern 160 (step S106), step S114 is then performed to execute the first reaction pattern 160 continuously. On the other hand, if the control unit 18 receives a second command during the execution of the first reaction pattern 160 (step S106), step S108 is then performed to look the second reaction pattern 162 up in the storage unit 16 according to the second command. Afterward, step S110 is performed to determine whether the second priority is prior to the first priority. If the second priority is prior to the first priority, step S112 is performed to pause or abandon the execution of the first reaction pattern 160 and execute the second reaction pattern 162. If the execution of the first reaction pattern 160 is paused in step S112, step S114 is then performed to execute the first reaction pattern 160 continuously after executing the second reaction pattern 162 completely. On the other hand, if the execution of the first reaction pattern 160 is abandoned in step S112, step S116 is performed to finish controlling the automatic machine 1 after executing the second reaction pattern 162 completely. Moreover, if the second priority is not prior to the first priority in step S110, step S114 is performed immediately to execute the first reaction pattern 160 continuously.

As mentioned in the above, when the control unit of the automatic machine of the invention receives a command and the storage unit stores a reaction pattern corresponding to the command, the control unit controls each of the output units to execute the corresponding reaction mode (e.g. motion mode, facial expression mode and/or voice mode) simultaneously. Furthermore, once the control unit receives another command during the execution of the reaction pattern, the control unit will execute the reaction pattern with higher priority according to the priority order of different reaction patterns. Accordingly, the automatic machine and controlling method of the invention can smoothly and simultaneously executing reactions including motion, facial expression and/or voice.

Those skilled in the art will readily observe that numerous modifications and alterations of the device and method may be made while retaining the teachings of the invention.

What is claimed is:

1. An automatic machine comprising:
N output units, N being a positive integer;
a storage unit for storing a first reaction pattern corresponding to a first command, the first reaction pattern comprising a header and N reaction modes, each of the reaction modes being corresponding to one of the output units, each of the reaction modes comprising M reaction frames, M being 0 or a positive integer, the header recording a number of the reaction frames of each reaction mode; and
a control unit electrically connected to the N output units and the storage unit, the control unit receiving the first command, looking the first reaction pattern up in the storage unit according to the first command, and selectively controlling at least one of the output units to execute the reaction frames correspondingly according to the header and the reaction modes.

2. The automatic machine of claim 1, further comprising:
a command input unit for receiving the first command and then transmitting the first command to the control unit.

3. The automatic machine of claim 1, wherein the output units comprise a set of motors, the reaction modes comprise a motion mode, each of the reaction frames, which is corresponding to the motion mode, records a set of motor information and a time tag, the control unit controls the set of motors to rotate according to the set of motor information and the time tag, the time tag is a suspend time or a time stamp.

4. The automatic machine of claim 1, wherein the output units comprise a light emitting array, the reaction modes comprise a facial expression mode, each of the reaction frames, which is corresponding to the facial expression mode, records a light emitting serial number and a time tag, the control unit controls the light emitting array to emit light according to the light emitting serial number and the time tag, the time tag is a suspend time or a time stamp.

5. The automatic machine of claim 1, wherein the output units comprise a speaker, the reaction modes comprise a voice mode, each of the reaction frames, which is corresponding to the voice mode, records a voice type, a string, a length of the string and a time tag, the control unit controls the speaker to sound a voice according to the voice type, the string, the length of the string and the time tag, the time tag is a suspend time or a time stamp, the voice is generated by a text-to-speech technique or a voice file.

6. The automatic machine of claim 2, wherein the first reaction pattern has a first priority, the storage unit further stores a second reaction pattern, the second reaction pattern is corresponding to a second command and has a second priority, once the control unit receives the second command from the command input unit during execution of the first reaction pattern, the control unit looks the second reaction pattern up in the storage unit according to the second command and determines whether the second priority is prior to the first priority, if the second priority is prior to the first priority, the control unit pauses or abandons the execution of the first reaction pattern and executes the second reaction pattern.

7. A method for controlling an automatic machine, the automatic machine comprising N output units, a control unit and a storage unit, N being a positive integer, the method comprising:
the control unit receiving a first command;
the control unit looking a first reaction pattern up in the storage unit according to the first command, the first reaction pattern comprising a header and N reaction modes, each of the reaction modes being corresponding to one of the output units, each of the reaction modes comprising M reaction frames, M being 0 or a positive integer, the header recording a number of the reaction frames of each reaction mode; and
the control unit selectively controlling at least one of the output units to execute the reaction frames correspondingly according to the header and the reaction modes.

8. The method of claim 7, the automatic machine further comprising a command input unit, the method further comprising:
the command input unit receiving the first command; and
the command input unit transmitting the first command to the control unit.

9. The method of claim 7, wherein the output units comprise a set of motors, the reaction modes comprise a motion mode, each of the reaction frames, which is corresponding to the motion mode, records a set of motor information and a time tag, the time tag is a suspend time or a time stamp, the method further comprises:
controlling the set of motors to rotate according to the set of motor information and the time tag.

10. The method of claim 7, wherein the output units comprise a light emitting array, the reaction modes comprise a facial expression mode, each of the reaction frames, which is corresponding to the facial expression mode, records a light emitting serial number and a time tag, the time tag is a suspend time or a time stamp, the method further comprises:
controlling the light emitting array to emit light according to the light emitting serial number and the time tag.

11. The method of claim 7, wherein the output units comprise a speaker, the reaction modes comprise a voice mode, each of the reaction frames, which is corresponding to the voice mode, records a voice type, a string, a length of the string and a time tag, the time tag is a suspend time or a time stamp, the voice is generated by a text-to-speech technique or a voice file, the method further comprises:
controlling the speaker to sound a voice according to the voice type, the string, the length of the string and the time tag.

12. The method of claim 7, wherein the first reaction pattern has a first priority, the method further comprises:
once the control unit receives a second command during execution of the first reaction pattern, looking a second reaction pattern up in the storage unit according to the second command, the second reaction pattern having a second priority;
determining whether the second priority is prior to the first priority; and
if the second priority is prior to the first priority, pausing or abandoning the execution of the first reaction pattern and executing the second reaction pattern.

\* \* \* \* \*